United States Patent [19]

Guha et al.

[11] Patent Number: 5,140,530
[45] Date of Patent: Aug. 18, 1992

[54] GENETIC ALGORITHM SYNTHESIS OF NEURAL NETWORKS

[75] Inventors: Aloke Guha, Minneapolis; Steven A. Harp, St. Paul; Tariq Samad, Minneapolis, all of Minn.

[73] Assignee: Honeywell Inc., Minneapolis, Minn.

[21] Appl. No.: 329,623

[22] Filed: Mar. 28, 1989

[51] Int. Cl.$^5$ .............................................. G06F 15/18
[52] U.S. Cl. ...................................... 395/13; 395/23; 395/24
[58] Field of Search .......................................... 364/513

[56] References Cited

U.S. PATENT DOCUMENTS

| | | | |
|---|---|---|---|
| 3,097,349 | 7/1963 | Putzrath et al. | 364/513 |
| 4,591,980 | 5/1986 | Huberman et al. | 364/513 |
| 4,593,367 | 6/1986 | Slack et al. | 364/513 |
| 4,697,242 | 9/1987 | Holland et al. | 364/513 |
| 4,935,877 | 6/1990 | Koza | 364/513 |

OTHER PUBLICATIONS

Towards the Evolution of Symbols; Dolan & Dyer; Proceedings of the Second Inter. Conf. on Genetic Algorithms (2nd ICGA); 1987; pp. 123-131.
Using the Genetic Algorithm to Generate LISP Code to Solve the Prisoner's Dilemma; Fujiki et al; 2nd ICGA; pp. 236-240.
On Using Genetic Algorithms to Search Program Spaces; De Jong; 2nd ICGA; pp. 210-215.
Tree Structured Rules in Genetic Algorithms; Bickel et al; 2nd ICGA; pp. 77-81.
The Argot Strategy: Adaptive Repesentation Genetic Optimizer Technique; Shaefer; 2nd ICGA; pp. 50-58.
An Adaptive Crossover Distribution Mechanism for Genetic Algorithms; Schaffer et al; 2nd ICGA; pp. 36-40.
Nonlinear Neural Networks: Principles, Mechanisms, and Architectures; Grossberg; Neural Networks, vol. 1, pp. 17-61; 1988.
Classifier Systems and Genetic Algorithms; Booker et al; Artificial Intelligence 40 (1989) 235-282.
Calibration of Neural Networks Using Genetic Algorithms with Application to Optimal Path Planning; Smith et al; First Annual Workshop on Space Operations, Automation, & Robotics (SOAR '87); Aug. 5-7, 1987; pp. 519-526.
"Genetic Algorithms", Charles T. Walbridge, Technology Review, vol. 92, Jan. 1989.
W. B. Dress and J. R. Knisley, "A Darwinian Approach to Artificial Neural Systems", 1987 IEEE, pp. 572-577.
D. J. Montana and L. Davis, "Training Feedforward Neural Networks Using Genetic Algorithms", 1989, pp. 1-10.
J. H. Holland, "Adaptation in Natural and Artificial Systems", 1975, pp. 89-120.
J. E. Baker, "Reducing Bias and Inefficiency in the Selection Algorithm", date unknown, pp. 14-21.
D. Whitley and T. Hanson, "Optimizing Neural Networks Using Faster, More Accurate Genetic Search", date unknown, pp. 391-396.
R. P. Lippman, "An Introduction to Computing with Neural Nets", Apr. 1987 IEEE, pp. 4-22.

*Primary Examiner*—Allen R. MacDonald
*Attorney, Agent, or Firm*—Michael B. Atlass; Charles G. Mersereau; Wayne B. Easton

[57] ABSTRACT

The disclosure relates to the use of genetic learning techniques to evolve neural network architectures for specific applications in which a general representation of neural network architecture is linked with a genetic learning strategy to create a very flexible environment for the construction of custom neural networks.

13 Claims, 14 Drawing Sheets

SPATIAL ORGANIZATION OF AREAS.
EACH SMALL SQUARE REPRESENTS A UNIT.
THE LABLES INDICATE THE "SHARE" IN EACH DIMENSION.

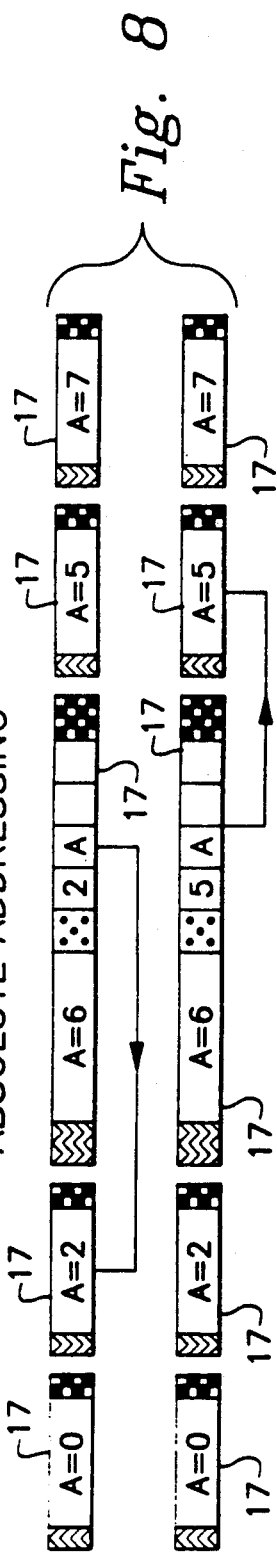
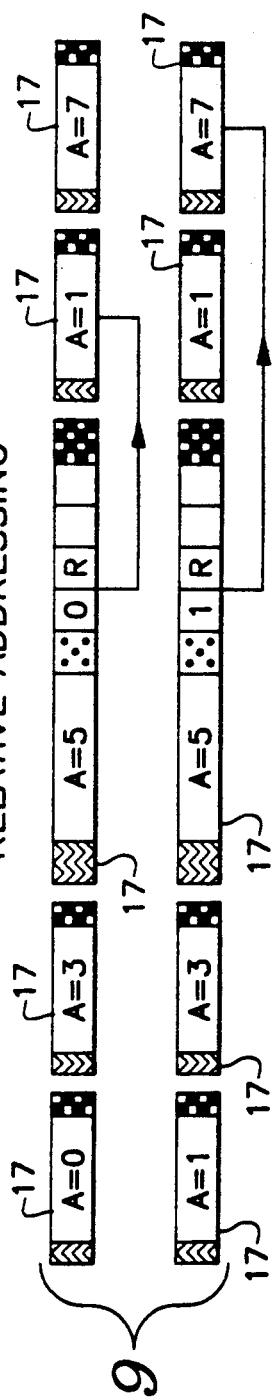
Fig. 8
Fig. 9

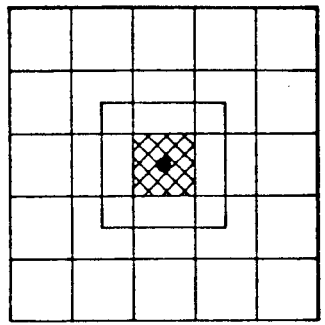
RADII ARE 1x1, SO A 2x2 BOX SURROUNDS THE CENTER DOT. IT COMPLEATELY ENCLOSES 1 UNIT, SHOWN SHADED
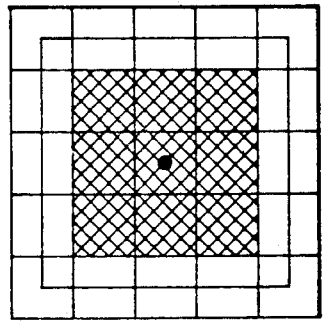
RADII ARE 2x2, SO A 4x4 BOX SURROUNDS THE CENTER DOT. IT COMPLEATELY ENCLOSES 9 UNITS, SHOWN SHADED
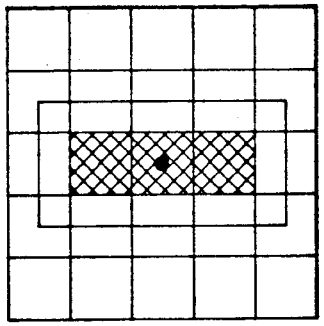
RADII ARE 1x2, SO A 2x4 BOX SURROUNDS THE CENTER DOT. IT COMPLEATELY ENCLOSES 3 UNITS, SHOWN SHADED
Fig. 13

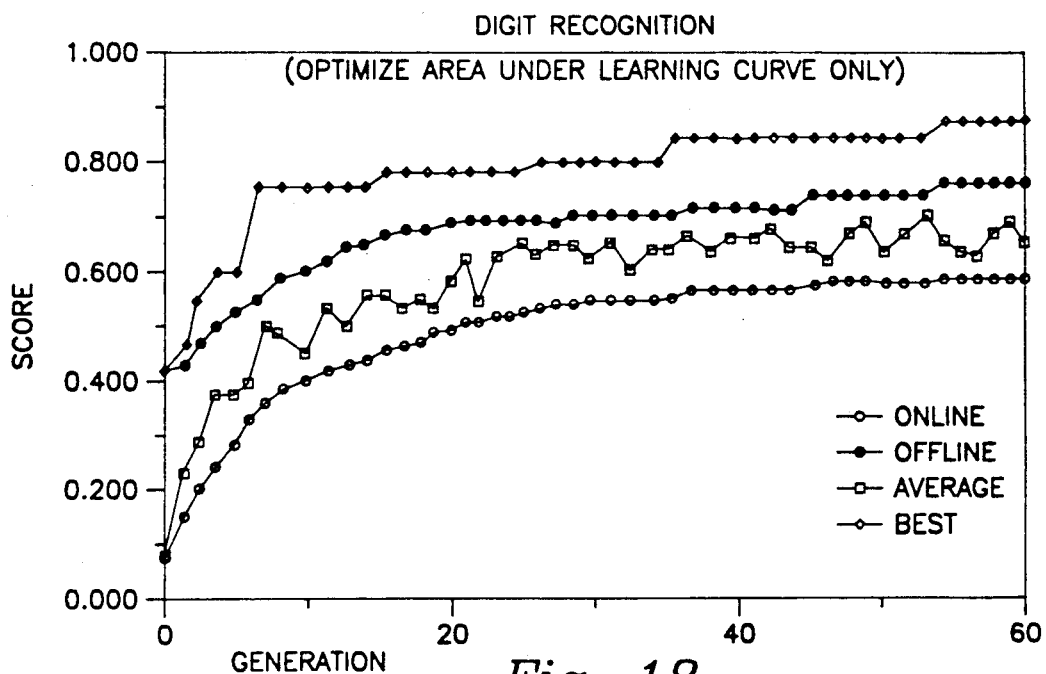
PERFORMANCE IN THE DIGIT RECOGNITION PROBLEM. SCORES DEPENDED ONLY ON THE RATE OF LEARNING (UNDER THE LEARNING CURVE)
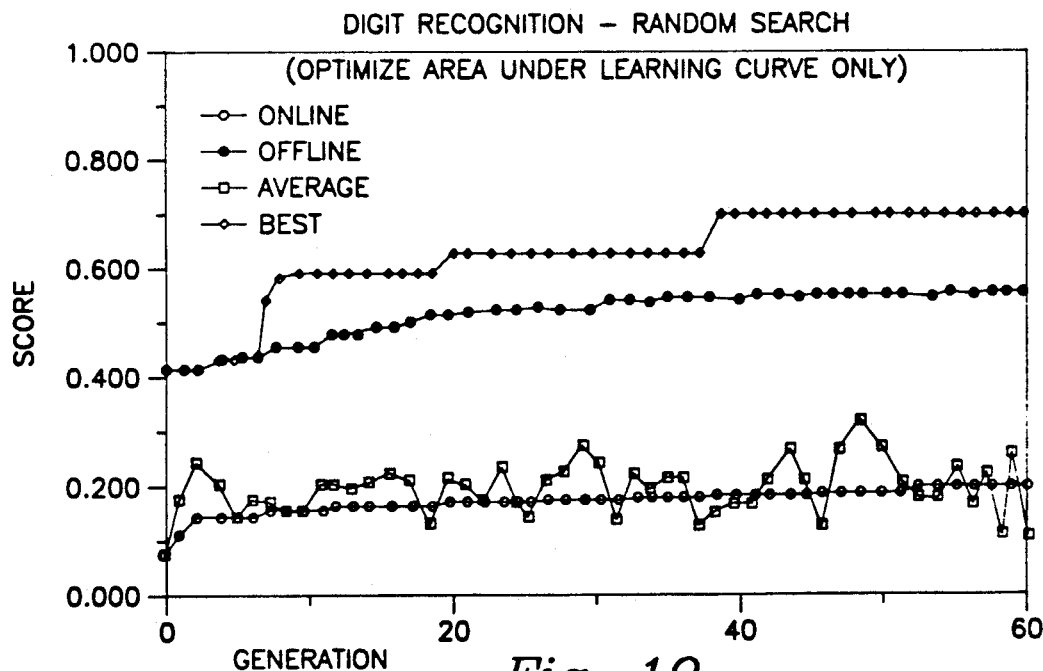
PERFORMANCE ON THE DIGIT RECOGNITION PROBLEM WITH RANDOM SEARCH REPLACING THE GENETIC OPERATORS. ONLY THE AREA UNDER THE LEARNING CURVE CONTRIBUTED TO THE SCORE OFF-LINE PERFORMANCE ON THE DIGIT RECOGNITION PROBLEM, COMPARING THE GA AND RANDOM SEARCH.

PERFORMANCE CURVES FOR THE DIGIT RECOGNITION PROBLEM WITH EQUAL WEIGHT ON THE PERCENT CORRECT AND THE AVERAGE FAN-OUT

GENETIC ALGORITHM SYNTHESIS OF NEURAL NETWORKS

The invention hereof relates to a method for using genetic type learning techniques in connection with designing a variety of neural networks that are optimized for specific applications.

Previous work in the design of neural networks has revealed the difficulty in determining an appropriate network structure and good values for the parameters of the learning rules for specific applications.

The genetic algorithm is an optimization method based on statistical selection and recombination. The method is inspired by natural selection. A few researchers (Dolan & Dyer (1987), Dress & Knisely (1987) Davis (1988), Montana and Davis (1989) and Whitley (1988)) have applied generic algorithms in a limited fashion to generate neural networks for specific problems. For example, Davis and Montana (1988, 1989) and Whitley (1988) use the genetic algorithm to adjust weights given a fixed network structure.

In the invention herein a general representation of neural network architectures is linked with the genetic learning strategy to create a flexible environment for the design of custom neural networks. A concept upon which the invention is based is the representation of a network design as a "genetic blueprint" wherein the recombination or mutation of subsequently generated editions of such blueprints result in different but related network architectures.

To illustrate the invention there is described herein a system for the genetic synthesis of a particular class of neural networks that we have implemented. Our current implementation is restricted to network structures without feedback connections and incorporates the back propagation learning rule. The invention can, however, be used for arbitrary network models and learning rules.

The method herein involves the use of genetic algorithm methods to design new neural networks. The genetic algorithm (GA) is a robust function optimization method. Its use is indicated over gradient descent techniques for problems fraught with local minima, discontinuity, noise, or large numbers of dimensions. A useful feature of the GA is that it scales extremely well, increasing dimensionality has comparatively little effect on performance. The first step in the application of the GA to a function is the encoding of the parameter space as a string of (typically binary) digits. Substrings in such a representation correspond to parameters of the function being optimized. A particular individual bit string (i.e. some choice of 1 of 0 for each position) represents a point in the parameter space of the function. The GA considers a population of such individuals. The population, in conjunction with the value of the function for each individual (generally referred to as "fitness"), represents the state of the search for the optimal string. The GA progresses by implicitly encoding information about the function in the statistics of the population and using that information to create new individuals. The population is cyclically renewed according to a reproductive plan. Each new "generation" of the population is created by first sampling the previous generation according to fitness; the method used for differential selection is known to be a near-optimal method of sampling the search space. Novel strings are created by altering selected individuals with genetic operators. Prominent among these is the crossover operator which synthesizes new strings by splicing together segments of two sampled individuals.

A main object of the invention is to provide a new method as referred to above for designing optimized artificial neural networks.

Other objects and advantages of the invention will become apparent from the following specification, appended claims and attached drawings.

In the drawings:

FIGS. 8 and 9 show examples of absolute and relative addressing for specifying the target destinations of projections which extend from one layer to another layer;

FIG. 13 shows a projection feature relating to connections between layers of the network;

FIGS. 18 to 21 show performance curves relating to the rate of learning of networks.

Figure 1:
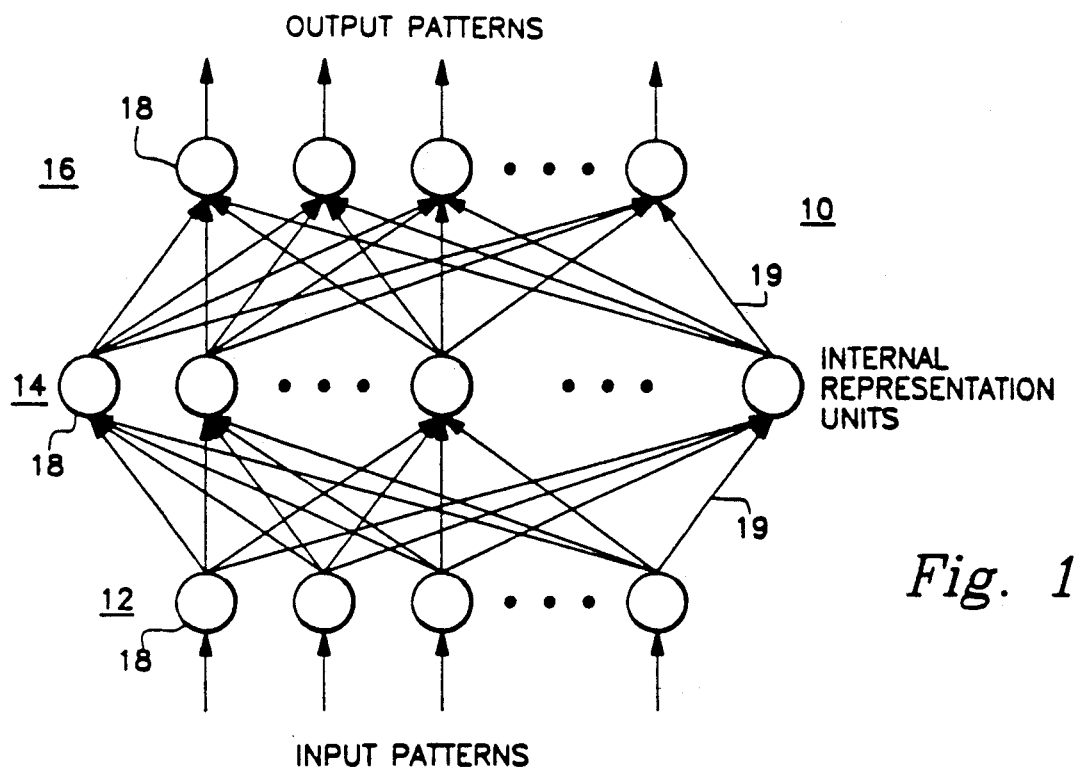
FIG. 1 illustrates a multilayer neural network of the type which may be designed for a specific purpose in accordance with the method of the present invention.

The method herein relates to the designing of multilayer artificial neural networks of the general type 10 shown in FIG. 1. The network 10 is illustrated as having three layers (or areas) 12, 14 and 16 but could have more than three layers or as few as one layer if desired. Each of the layers has computational units 18 joined by connections 19 which have variable weights associated therewith in accordance with the teaching of the prior art.

In this and other figure connections are shown in the forwardly feeding direction. The invention is not limited to this construction, however, and feedback connections may also be accommodated, for example.

Also, the scope of the network design method disclosed herein is not limited to the design of the network shown in FIG. 1.

Figure 2:
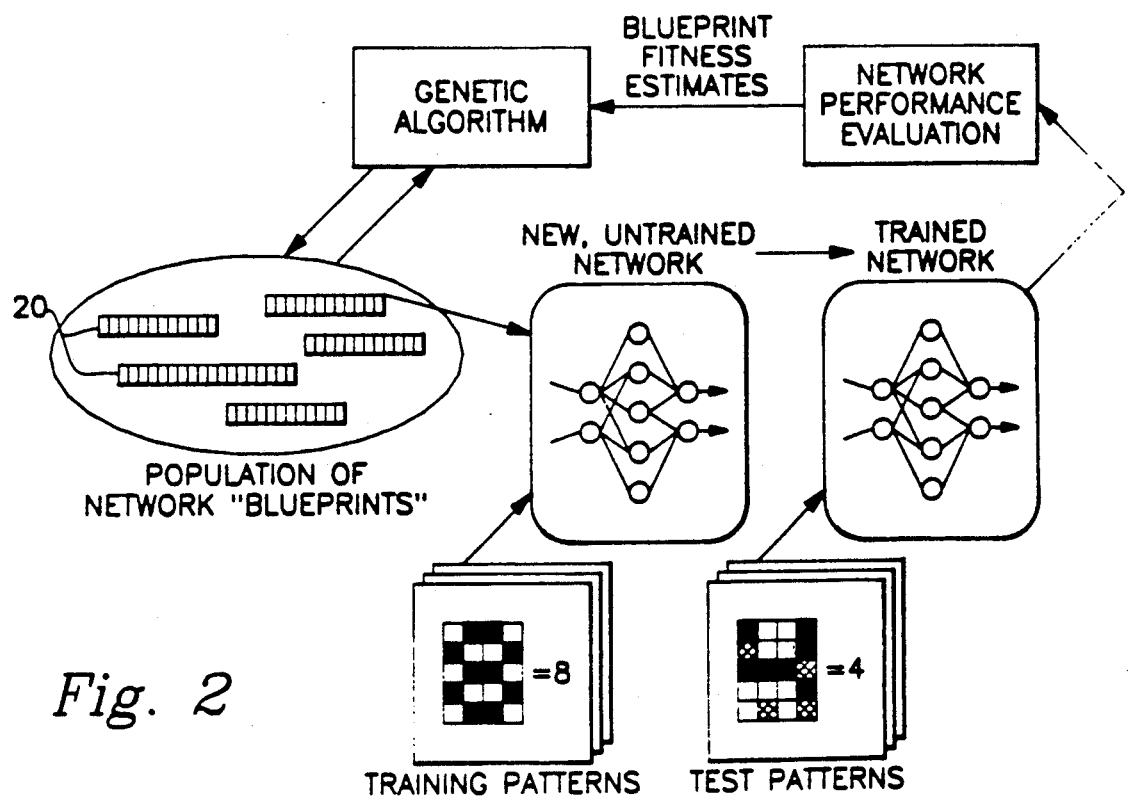
FIG. 2 illustrates schematically how a population of "blueprints" (designs for different neural networks) is cyclically updated by the genetic algorithm based on their fitness.

FIG. 2 illustrates schematically how a population of blueprints 20 (i.e. bit string designs for different neural networks) are cyclically updated by a genetic algorithm based on their fitness. The fitness of a network is a combined measure of its worth on the problem, which may taken into account learning speed, accuracy and cost factors such as the size and complexity of the networks.

The method begins with a population of randomly generated bit strings 20. The actual number of such bit strings is somewhat arbitrary but a population size of 30 to 100 seems empirically to be a good compromise between computational load, learning rate and genetic drift.

NEURAL NETWORK LEARNING ALGORITHMS

Learning approaches for neural networks fall into three general categories: unsupervised learning, reinforcement learning, and supervised learning. In unsupervised learning, the network receives no evaluative feedback from the environment; instead it develops internal models based on properties of received inputs. In reinforcement learning, the environment provides a weak evaluation signal. In supervised learning the "desired output" for the network is provided along with every training input. Supervised learning, specifically back propagation, is used to illustrate the invention but in concept the invention can be used with any learning approach.

The set of input-output examples that is used for supervised learning is referred to as the training set. The learning algorithm can be outlined as follows: FOR EACH (training-input, desired-output) pair in the Training-Set
Apply the training-input to the input of the network.
Calculate the output of the network.
IF the output of the network ≠ desired-output
THEN modify network weights The entire loop through the training set, referred to as an epoch, is executed repeatedly. One or both of two termination criteria are usually used: there can be a lower bound on the error over an epoch and/or a limit on the number of epochs. Training a network in this fashion is often very time consuming. Until better learning techniques become available, it is best to plan the training phase as an "off-line" activity. Once trained, the network can be put to use. The computational demands of such a network during the operational phase can usually be satisfied with only rudimentary hardware for many interesting applications.

The neural network learning approach which we have currently implemented is the well-known backpropagation algorithm. (Werbos, 1974; Le Cun, 1986; Parker, 1985; Rumelhart, Hinton & Williams, 1985).

The backpropagation algorithm is described in Appendix B.

BLUEPRINT REPRESENTATIONS

The invention herein is mainly directed to a representation of the blueprint 20 that specifies both the structure and the learning rule, the genetic algorithm parameters that determine how the genetic operators are used to construct meaningful and useful network structures, and the evaluation function that determines the fitness of a network for a specific application.

The development of a bit string representation 20 for the neural network architecture of a network 10 is a major problem with which the concept of the invention is involved. Biological neural networks are not yet understood well enough to provide clear guidelines for synthetic networks and there are many different ways to parameterize network organization and operation.

The representation of blueprints or bit strings 20 for specialized neural networks should ideally be able to capture all potentially "interesting" networks, i.e., those capable of doing useful work, while excluding flawed or meaningless network structures. It is obviously advantageous to define the smallest possible search space of network architectures that is sure to include the best solution to a given problem. An important implication of this goal in the context of the genetic algorithm is that the representation scheme should be closed under the genetic operators. In other words, the recombination or mutation of network blueprints should always yield new, meaningful network blueprints. There is a difficult trade off between expressive power and the admission of flawed or uninteresting structures.

Figure 3:
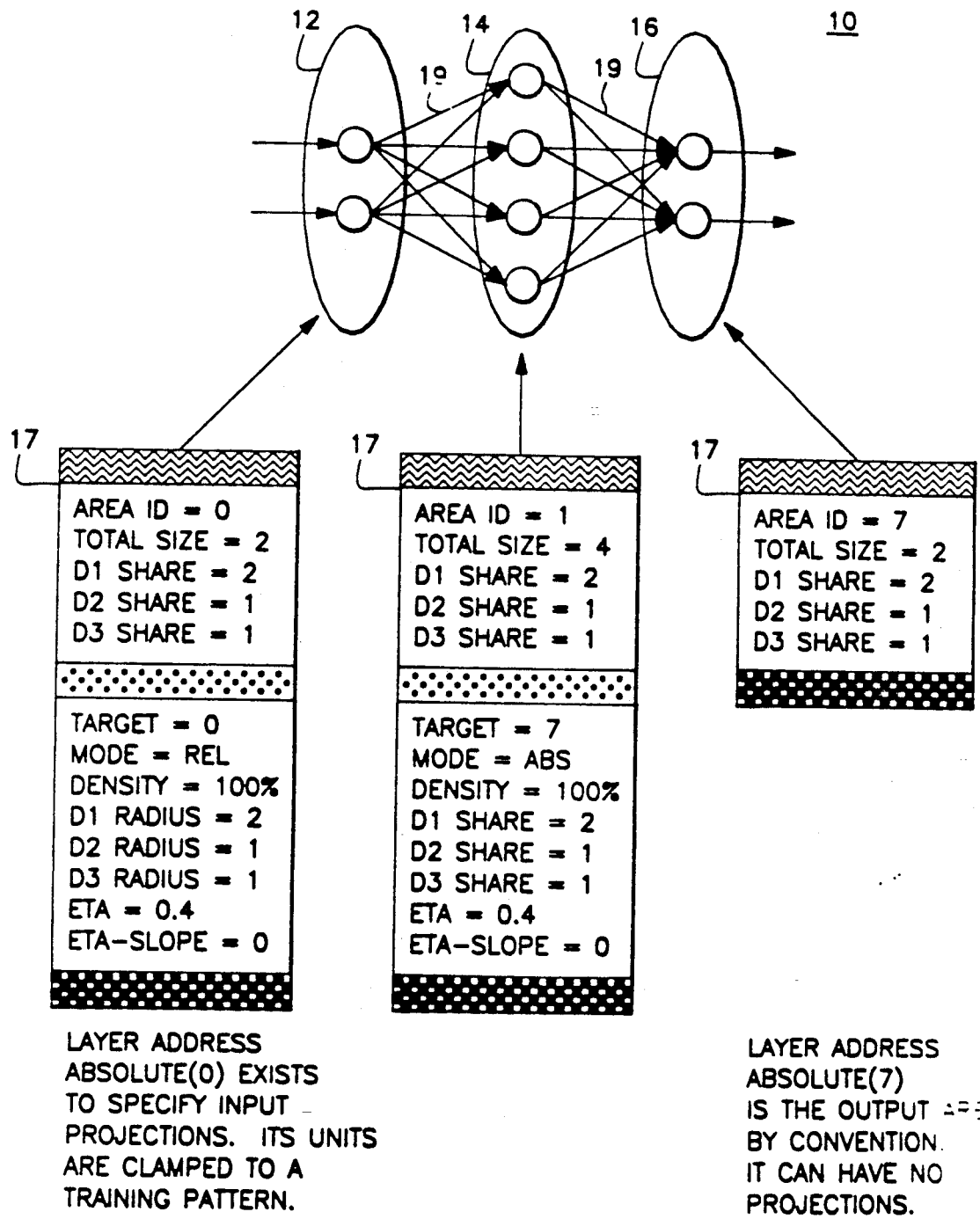
FIG. 3 shows schematically an example of a three-layer network which may be described by a bit string representation in accordance with the invention.

FIG. 3 shows schematically an example of how each layer of a three-layer network may be described in accordance with the invention by a bit string representation which comprises three substrings 17. The format for a single substring 17 is shown in more detail in FIG. 4.

Figure 5:
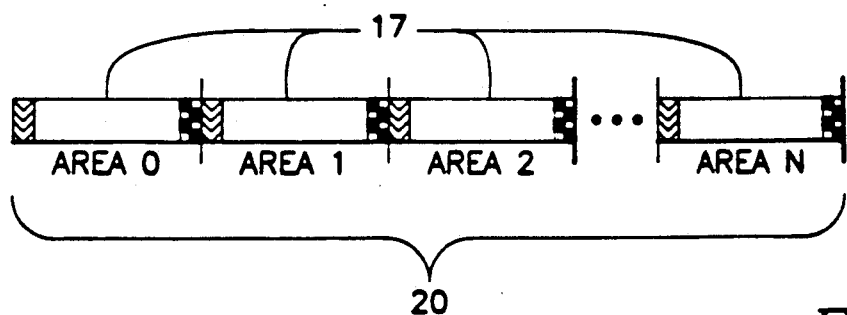
FIG. 5 illustrates the gross anatomy of a network reprsentation having areas or layers O to N.

The gross anatomy of a multilayer network representation 20 having substring layers or areas 17 (Area O to Area N) is illustrated in FIG. 5. Conceptually, all of the parameters for a single network are encoded in one long string of bits which is the representation 20 of FIG. 5. The patterned bars are markers indicating the start and end of the individual area or layer segments 17.

The term projection as used herein has reference to the grouping or organization of the connections 19 which extend between the computational units 18 of the layers of the networks such as in the network illustrations of FIGS. 1 and 3.

In FIG. 1 the input connections to layer 12 represent a single input projection and the output connections extending outwardly from layer 16 represent a single output projection. Likewise the connections 19 between layers 12 and 14 represent a single projection and the connections 19 between the layers 14 and 16 represent a single projection.

Figure 6:
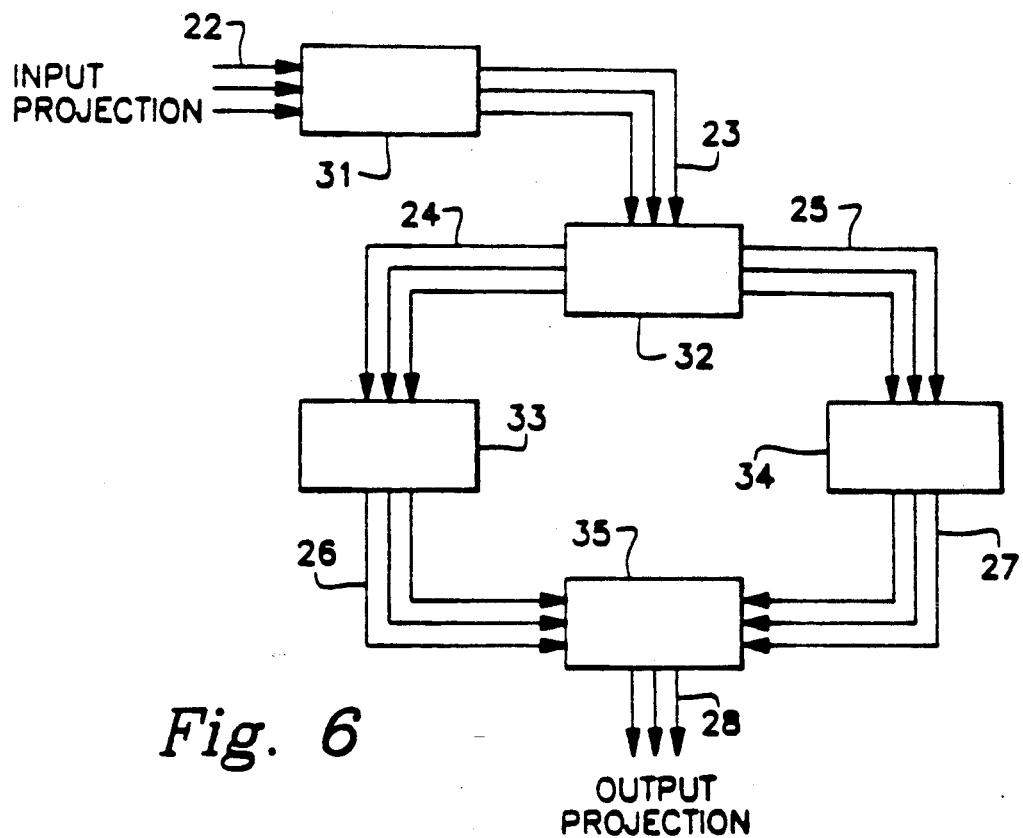
FIG. 6 illustrates an arrangement of areas (or layers) and projections extending therebetween.

An example of a projection arrangement for a particular network is shown in FIG. 6 with projections 22 to 28 being illustrated for layers or areas 31 to 35. Of interest is that layer 32 has two projections 24 and 25 extending respectively to layers 33 and 34. Also of interest is the opposite arrangement wherein layer 35 receives projections 26 and 27 from layers 33 and 34 respectively.

Each of the projections is represented by three lines which signify that each projection consists of a predetermined or desired plurality of only the connections 19 which extend between two particular layers.

Figure 4:
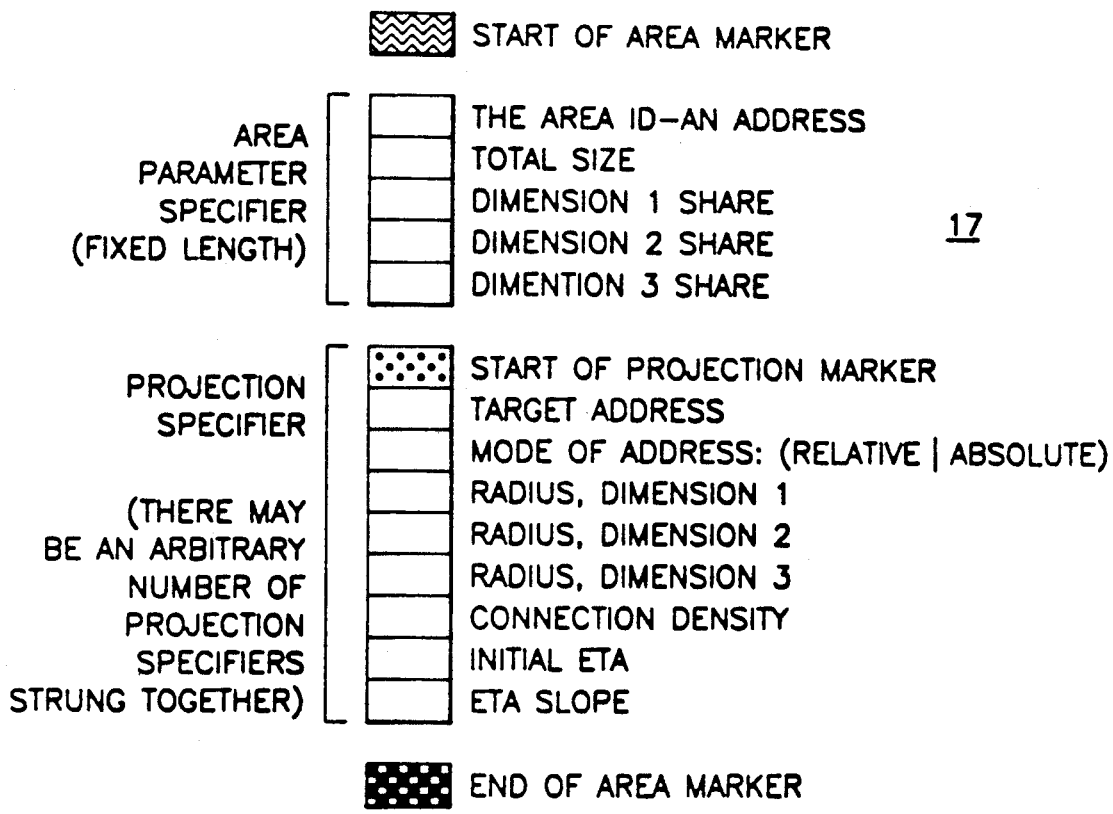
FIG. 4 illustrates a bit string representation which facilitates practicing the invention.

Referring to FIG. 4, it will be apparent that an area or layer specification substring 17 as illustrated in this figure is applicable to each one of the layers 12, 14 and 16 of the network 10 of FIG. 1.

A bit string 20 is thus composed of one or more segments or substrings 17, each of which represents a layer or area and its efferent connectivity or projections. Each segment is an area specification substring 17 which consists of two parts:

An area parameter specification (APS) which is of fixed length, and parameterizes the area or layer in terms of its address, the number of units 18 in it, and how they are organized.

One or more projection specification fields (PSFs), each of fixed length. Each such field describes a connection from one layer to another layer. As the number of layers is not fixed in this architecture (although bounded), the length of this field will increase with the number of projection specifiers required. Of course, this includes the situation where there are zero (or no) hidden layers. A projection (e.g., on the projections 22 to 28 in FIG. 6) is specified by the address of the target area, the degree of connectivity and the dimension of the projection to the area, etc.

The fact that there may be any number of areas 17 motivates the use of markers with the bit string to designate the start and end of APSs and the start of PSFs. The markers enable a reader program to parse any well-formed string into a meaningful neural network architecture. The same markers also allow a special genetic crossover operator to discover new networks without generating "nonsense strings". Markers are considered "meta-structure": they serve as a framework but don't actually occupy any bits.

FIG. 4 shows how the APS and PSF are structured in our current representation. The portions of the bit string representing individual parameters are labeled boxes in the figure. They are substrings consisting of some fixed number of bits. Parameters described by an interval scale (e.g. 0, 1, 2, 3, 4) are rendered using Gray coding, thus allowing values that are close on the underlying scale to be close in the bit string representation (Bethke, 1980, Caruana & Schaffer, 1988).

In the APS, each area or layer has an identification number that serves as a name. The name need not be unique among the areas of a bit string. The input and output areas have the fixed identifiers, 0 and 7 in the embodiment herein.

Figure 7:
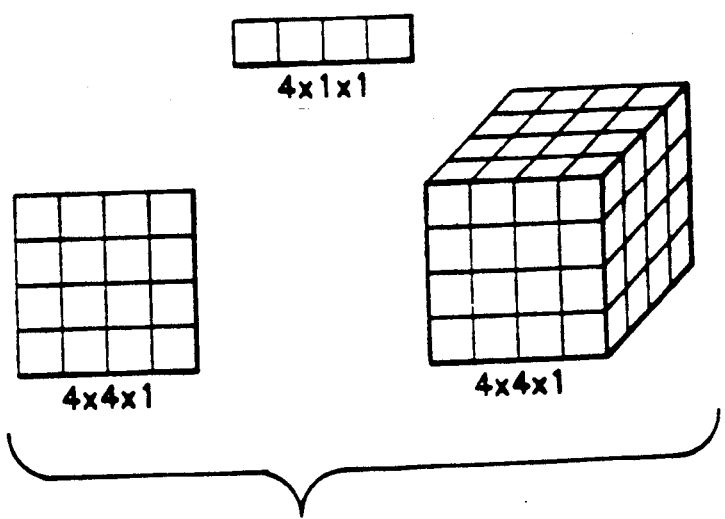
FIG. 7 shows the spatial organization of layers.

An area also has a size and a spatial organization. The "total size" parameter determines how many computational units 18 the area will have. It ranges from 0 to 7, and is interpreted as the logarithm (base 2) of the actual number of units; e.g., if total size is 5, there are 32 units. The three "dimension share" parameters, which are also base 2 logarithms, impose a spatial organization on the units. The units of areas may have 1, 2 or 3 dimensional rectilinear extent, as illustrated in FIG. 7.

The motivation for this organization comes from the sort of perceptual problems to which neural networks are apparently well suited. For example, an image processing problem may best be served by square array, while an acoustic interpretation problem might call for vectors. The organization of the units in more conventional approaches is often left implicit. In the invention herein dimensionality has definite implications for the architecture of projections such as the projections 22 to 28 of FIG. 6.

The PSFs in an area's segment of the bit string determine where the outputs of units in that layer will (attempt to) make efferent connections, and how. The representation scheme does not assume a simple pipeline architecture, as is common. FIG. 6, for example, shows a five-area network in which projections split from the second area and rejoin in the fifth.

Each PSF indicates the identity of the target area. There are currently two ways it can do this, distinguished by the value of a binary addressing mode parameter in each PSF. In the "Absolute" mode, the PSF's address parameter is taken to be the ID number of the target area. Some examples of absolute addressing are shown in FIG. 8.

The "Relative" mode indicates that the address bits hold the position of the target area in the bit string relative to the current area. A relative address of zero refers to the area immediately following the one containing the projection; a relative address of n refers to the nth area beyond this, if it exists. Relative addresses indicating areas beyond the end of the blueprint are taken to refer to the final area of the blueprint-the output area. Some examples of relative addressing are shown in FIG. 9.

The purpose of different addressing schemes is to allow relationships between areas to develop, and be sustained and generalized across generations through the genetic algorithm's reproductive plan. Specifically, the addressing schemes are designed to help allow these relationships to survive the crossover operator, either intact or with potentially useful modifications. Absolute addressing allows a projection to indicate a target no matter where that target winds up in the chromosome of a new individual. Relative addressing helps areas that are close in the bit string to maintain projections, even if their IDs change.

Figure 10:
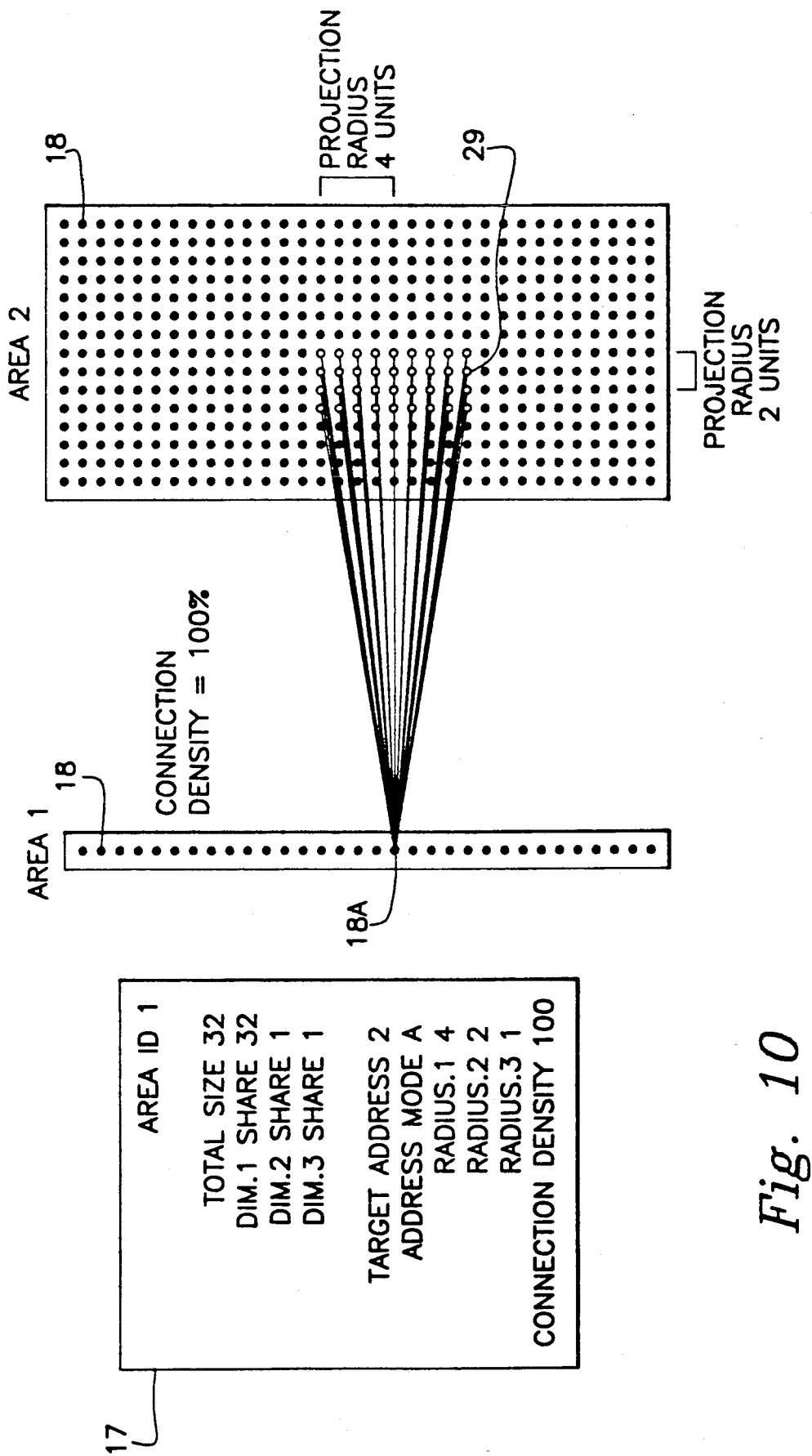
FIGS. 10 to 12 show illustrative examples of the area specification substring of FIG. 4.
Figure 11:
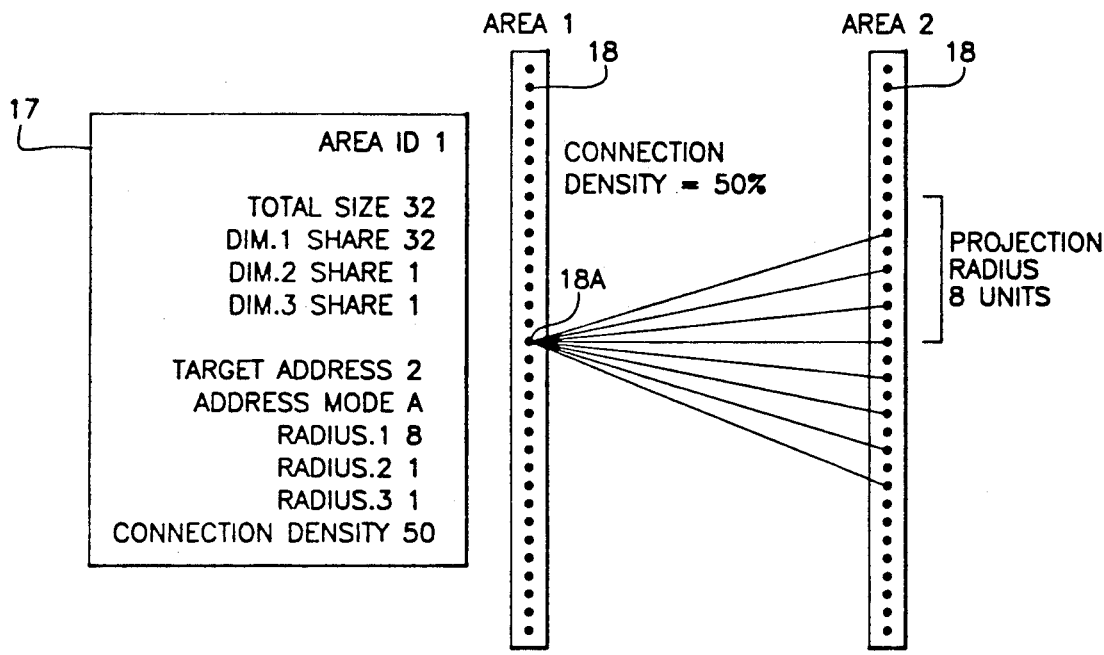
Figure 12:
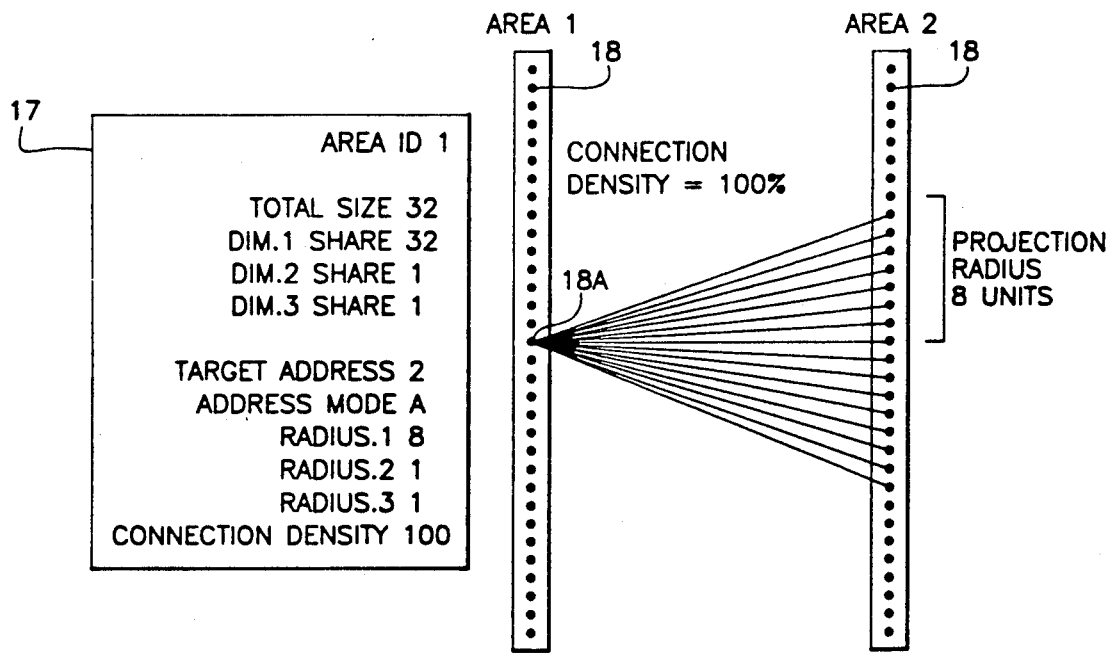

Referring to FIGS. 10 to 12, the dimension radii parameters (also base 2 logarithms) allow units in an area to project only to a localized group of units in the target area. This feature allows the target units to have localized receptive fields 29, which are both common in biological neural networks and highly desirable from a hardware implementation perspective. Even within receptive fields 29, projections between one area or layer and another do not necessarily imply full factorial connectivity. The connection density parameter for the projection may stipulate one of eight degrees of connectivity between 30% and 100%.

At this point it may be well to mention that, because of the magnitude of the numbers involved for the units 18 and the connections 19, it is contemplated that in a typical system the numbers will be represented by their logarithms. In FIGS. 10 to 12 and 15 herein which show examples of the substring 17, decoded numbers are used by way of illustration to facilitate an understanding of the concepts.

Projections include a set of weighted connections. The weights are adjusted by a learning rule during the training of the network. Parameters are included in the PSF to control the learning rule for adjusting the weights of the projection. The eta parameter controls the learning rate in back propagation and may take on one of 8 values between 0.1 and 12.8. Eta need not remain constant throughout training. A separate eta-slope parameter controls the rate of exponential decay for eta as a function of the training epoch.

An example of how this representation scheme can be used to specify a 3-layer network is shown in FIG. 3.

The first and last areas or layers of the network have a special status. The first, the input area, represents the set of terminals that will be "clamped" by the network's environment, effectively the input stimulus. The final area is always the output area, and has no projections.

A blueprint representation in BNF of the neural network described herein is Appendix A at the end hereof. It is anticipated that there will be future modifications and additions to it.

FIGS. 10 to 12 show three examples of substrings 17 which illustrate the projection specifier sections thereof relative to the radius and the connection density parameters. These figures show examples of projections 21 from a layer or Area 1 to a layer or Area 2. The projection in FIG. 10 is from a one dimensional area (Area 1) to a two dimensional area (Area 2) and the projections in FIGS. 11 and 12 are each from a one dimensional area (Area 1) to another dimensional area (Area 2).

In FIG. 10 the illustrated projection is to an 8 by 4 projection array 29 of computational units 18 and, by convention, this array is deemed to have a radius of 4 in the vertical direction and a radius of 2 in the horizontal direction. The object array 29 is symmetrically arranged relative to the source unit 18a in Area 1. As each unit within the boundary of the projection array 19 is connected, the connection density parameter is 100.

It will be understood that each of the computational units 18 in Area 1 will in a similar manner have connections to respective 8×4 projection arrays of units in Area 2 which results in substantial overlapping of projection arrays and a very dense connection system.

In FIG. 11 the projections are to every other one of a linear array of 20 units. The radius is 8 indicated but the connection density parameter is only 50 because only half of the units within the radius are connected.

FIG. 12 is similar to FIG. 11 except that every computational unit in the array is connected and thus the connection density is 100.

FIGS. 11 and 12 are similar to FIG. 10 relative to the matter of having each unit in Area 1 connected to a respective projection array of units in Area 2.

Potential target units of a projection from a given source unit are determined by radii along three dimensions. FIG. 13 shows some two dimensional examples of this.

Figure 14:
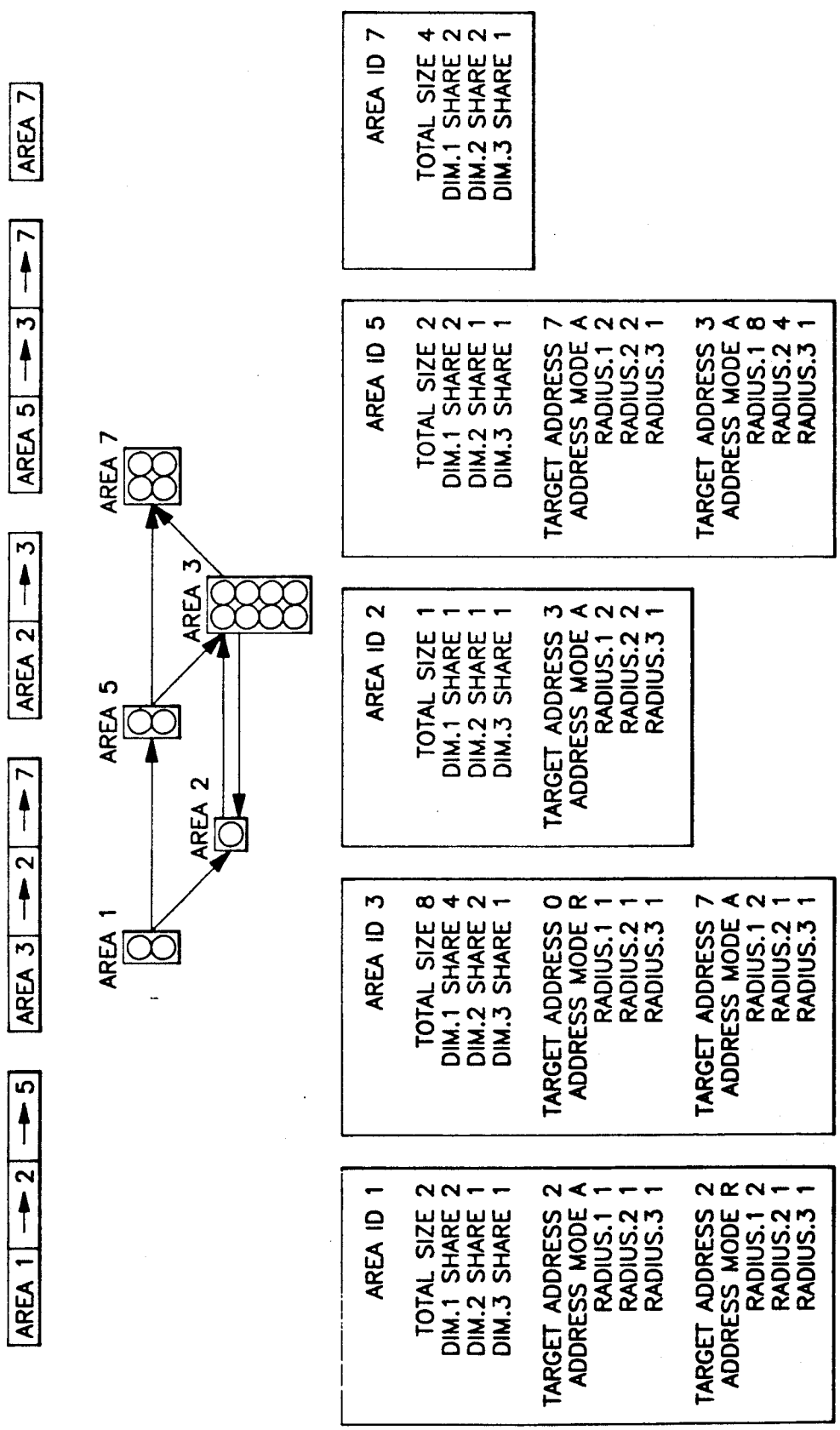
FIG. 14 shows a schematic example of a specific network structure generated by the method herein.
Figure 15:
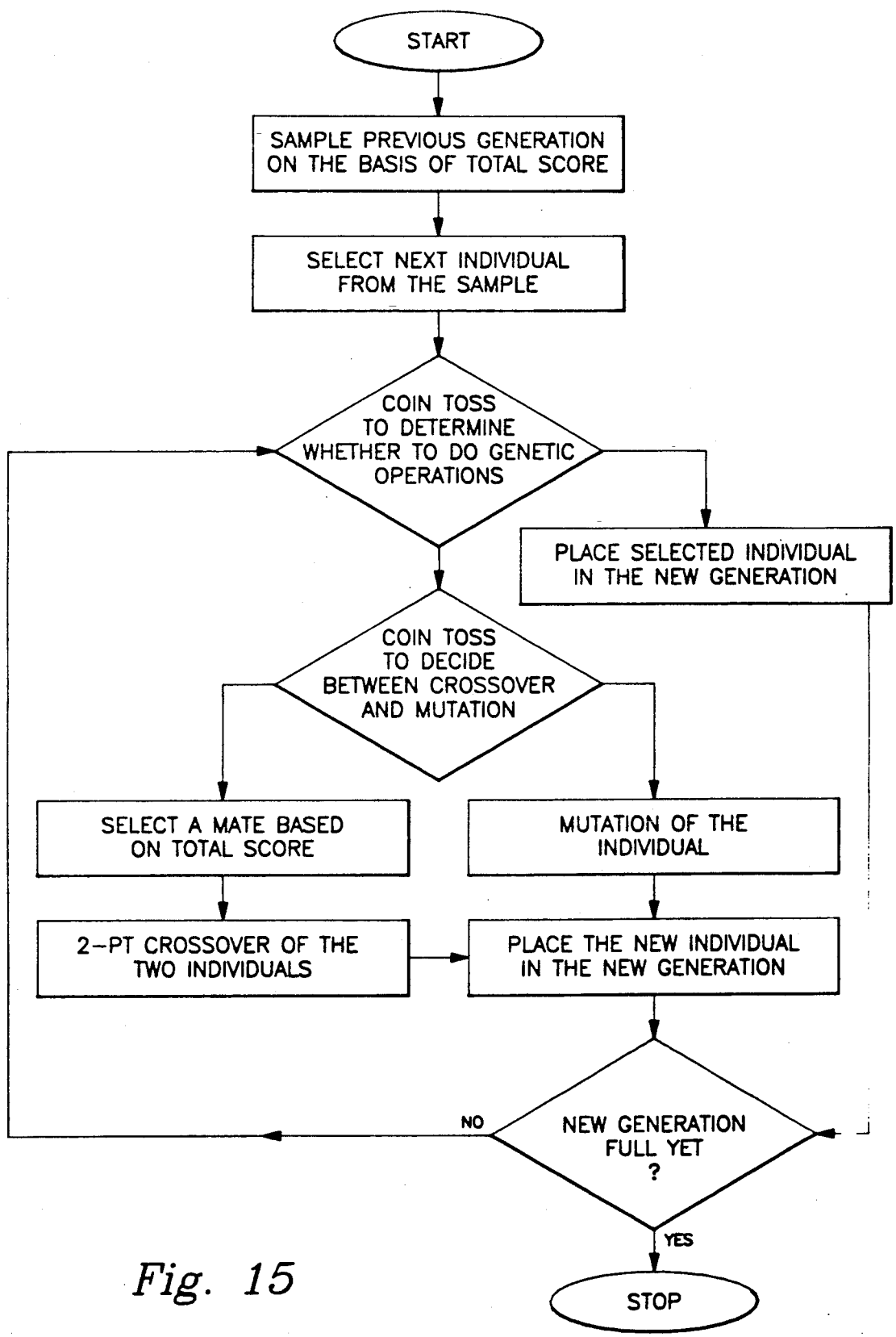
FIG. 15 shows the basic reproductive plan used in experiments pursuant to the method herein.

FIG. 14 shows a schematic example of a specific network structure generated by the method herein.

ADAPTING GENETIC ALGORITHMS

The version of the genetic algorithm used in the method herein employs a reproductive plan similar to that described by Holland (1975) as "type R". The basic plan for generating each new generation is given in FIG. 15. The sampling algorithm is based on the stochastic universal sampling scheme of Baker (1987). This is preferred for its efficiency and lack of bias. Some of the details are not shown by the diagram. A final step was added to insure that the best individual from generation i was always retained in generation i+1.

The genetic algorithm (GA) itself has a number of parameters. Good values for these are important to the efficient operation of the system. These parameters include the population size, the rates at which to apply the various genetic operators, and other aspects of the synthetic ecology.

Two genetic operators have been used: crossover and mutation. The crossover operator effectively exchanges homologous segments from the blueprints of two networks from the current generation to create a blueprint for a network in the next generation. In most applications of the genetic algorithm, homologous segments are identifiable by absolute positions in the bit string. For example, The Nth bit will always be used to specify the same trait in any individual. Because the representation herein allows variable length strings, a modified two-point crossover operator was employed that determined homologous loci on two individuals by referring to the string's markers, discussed above. The decision to use a two-point crossover as opposed to the more common single-point version was motivated by Booker's (1987) report that improved off-line performance could be achieved this way.

The mutation operator was used at a low rate to introduce or reintroduce alleles-alternate forms of the same functional gene. Current applications of the genetic algorithm have demonstrated an effective contribution from mutation at rates on the order of $10-2$ or less.

Despite the fact that the bit string representation was designed with closure under the genetic operators in mind, it is still possible for the GA to generate individuals that are prima facie unacceptable. A blatant example would be a network plan that had no pathway of projections from input to output. Subtler problems arise from the limitations of our simulation capability. In our initial work we have limited recurrence; network plans with feedback cannot be tolerated under simple back propagation. Two strategies have been employed for minimizing the burden of these misfits. First, the reproductive plan culls individuals with fatal abnormalities; individuals with no path from input to output area compose the bulk of this group. Second, blueprints with minor abnormalities are "purified" in their network implementation, i.e. their defects are excised.

Figure 16:
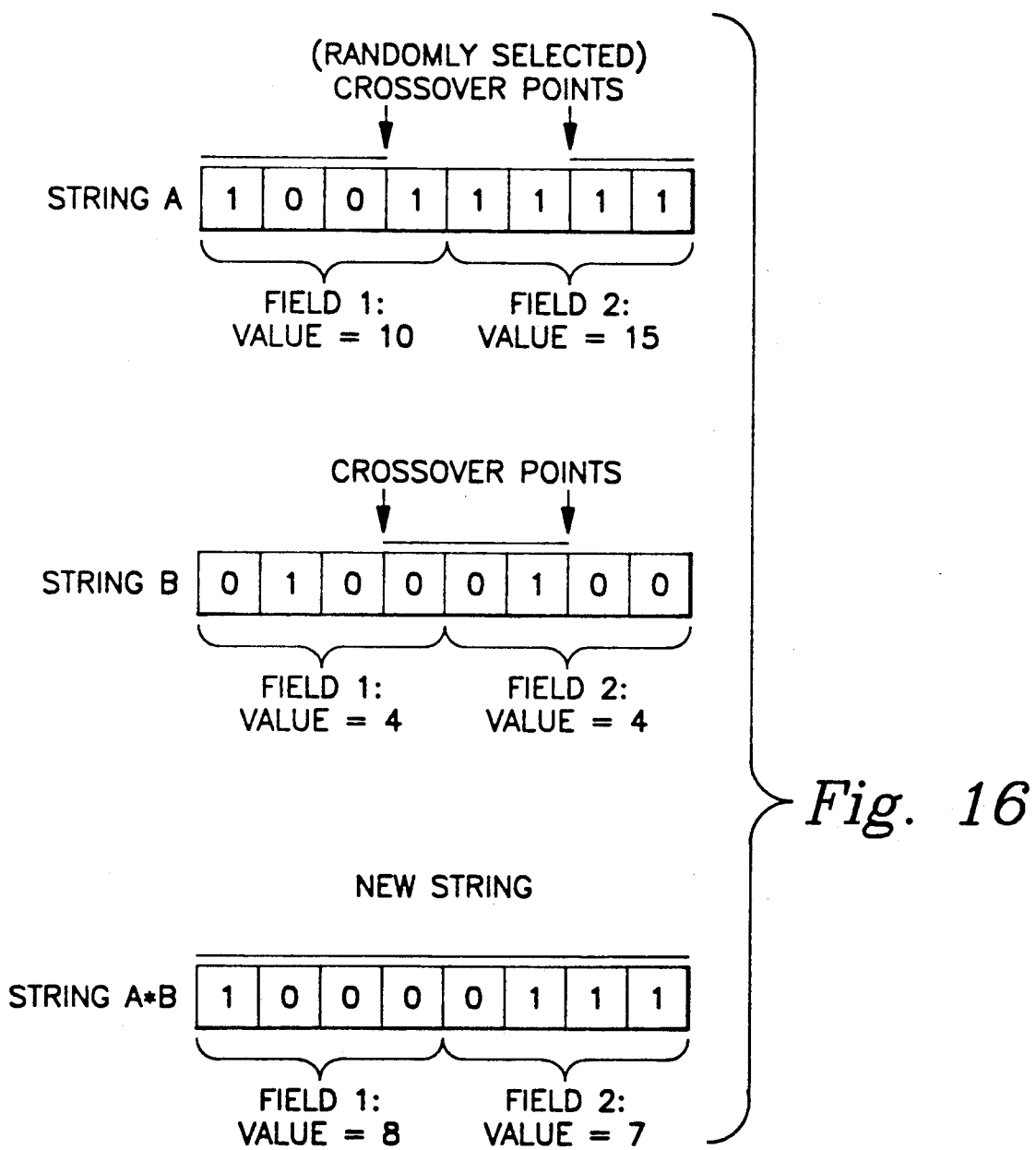
FIG. 16 is an example of the operation of a genetic operator.

FIG. 16 shows an example of how the crossover operator can create new strings with different values for fields than either of the parents. Here it is assumed that the fields use a simple binary encoding scheme.

EVALUATION OF SYNTHESIZED NETWORKS

Suitable improvements over generations can only be accomplished if the evaluation function used to measure the fitness of a network is appropriate. A measure of fitness is necessary for the GA to produce better and better networks. It is helpful to envision the algorithm as exploring the surface over the blueprint representation space defined by this function in an attempt to locate the highest peaks.

In accordance with the requirements of the evaluation function stated above, we have initially formulated the evaluation function as a weighted sum of the performance metrics, $P_i$. The evaluation function, $F(i)$, for individual i can be expressed as:

$$F(i) = \sum_{j=1}^{n} a_j p_j(i)$$

The coefficients $a_j$ may be adjusted by the user to reflect the desired character of the network. Metrics that have been considered thus far include performance factors such as observed learning speed and the performance of the network on noisy inputs, and cost factors such as the size of the network, and the number of connections formed. We have adopted a melange of different performance and cost factors since performance criteria vary from application to application. Because the relative weight on each factor can be modified, the network structure can be tuned for different optimization criteria. For example, if one of our goals is to synthesize networks that are computationally efficient, the size metrics might be given negative weights. On the other hand, if accuracy and noise tolerance is more crucial, then the performance on noisy input patterns would be given a higher weight.

EVALUATION OF GA PERFORMANCE

In order to make conclusions about the performance of the genetic algorithm (as opposed to the networks themselves) in discovering useful architectures, we require some standard to compare it against. This is difficult since there seems to be no published data directly relevant to the problem. Our approach is to run a control study in which network blueprints are generated at random, evaluated, and the best retained. This is effected by simply "turning off" the genetic operators of crossover and mutation. Random search is an oft employed benchmark of performance that other search algorithms must exceed to demonstrate their value.

DATA STRUCTURES

Figure 17:
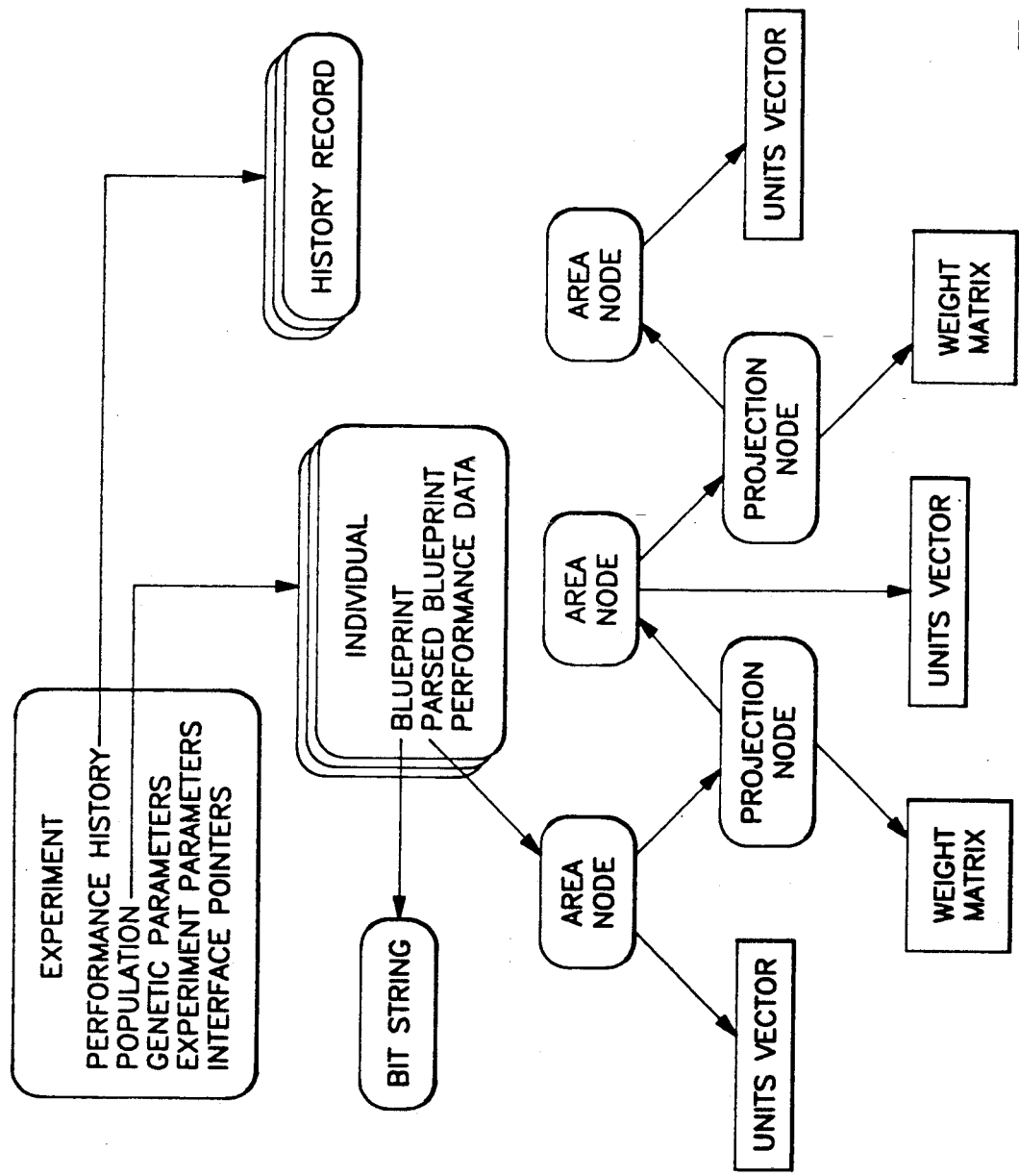
FIG. 17 shows the principle data structures in a current implementation with one individual being shown parsed and instantiated.

The major data structures in a current implementation of the invention are objects that are created and linked together at run time. The most prominent object is the "experiment" which maintains the current population, the history of performance over generations, as well as various control and interface parameters. The performance history is a list of records, one per generation, noting, among other things, on-line, off-line, average and best scores. The population comprises the individuals of the current generation as shown in FIG. 17.

Each individual has an associated blueprint, which is stored as a bundle of bit vectors [bit vectors are one-dimensional arrays in which each element occupies one bit in the machine's memory].

The bit vectors are of two types, areas (APS) and projections (PSF), as indicated by the BNF. The structure of each type is defined by a Lisp form, indicating the names of each field, and how many bits it should occupy. For example, the projection specification is defined as:

```
(def-bit-vector PROJECTION-SPEC
    (radius-1 3)
    (radius-2 3)
    (radius-3 3)
    (connection-density 3)
    (target-address 3)
    (address-mode 1)
    (initial-eta 3)
    (eta-slope 3) )
```

This form automatically defines the accessors needed to extract the value for each parameter from any given bit vector. The accessors transparently effect the gray coding and decoding fields. Most of the integral values of fields are interpreted through lookup tables; for example, an eta table translates the values 0 ... 7 to etas from 0.1 to 12.8.

Genetic operators such as crossover and mutation directly modify this bit vector blueprint, which is considered the master plan for the individual. Pieces of it are actually shared with its offspring. The bit vectors are not directly useful in running an actual neural network, however. For this, the individual must be parsed, purified, and instantiated.

When an individual is parsed, the bit string form of the blueprint is translated into a network of nodes-an area node for each area, and a projection node for each projection. Parsing works out the inter-area addressing done by projections, and the nodes carry parameter values interpreted from the associated bit vectors. The network, or parsed blueprint, is associated with the object representing individual.

A parsed blueprint may have defects that prevent a meaningful interpretation as a neural network. For example, it might contain projections with no valid target, or projections indicating feedback circuits, which are prohibited in the current implementation. Rather than discarding slightly imperfect individuals, an attempt is made to patch them after parsing. The patching step is called purification. The purifier removes dangling nodes and cuts circuits in an attempt to create a viable individual while making as few changes as possible.

Following parsing and purification, an individual is instantiated. Instantiation involves allocating and initializing vectors for units, weight matrices, mask matrices, threshold vectors, and other numerical storage. References to these data objects are kept in the nodes of the individual's parsed blueprint.

THE EVALUATION PROCESS

The purpose of the parse/purify/instantiate sequence is to set the stage for the evaluation of the individual, i.e. the computation of a score. The score is a weighted sum of a set of performance metrics. The weights may be set by the user at run time.

Some of these metrics are immediate consequences of instantiation, e.g. number of weights, number of units, number of areas, and average fan-out. Other metrics depend on the individual network's performance on a given problem (such as digit recognition). Examples of such metrics are: the learning rate of the network, its final performance on the training set, its performance on non-degraded inputs and on novel inputs, and its performance after temporarily mullifying a random sample of either the weights or units of the network.

RESULTS, ANALYSIS AND DISCUSSION

Despite the restricted scope of initial experiments, the method herein has produced reasonable networks, and has achieved significant improvements over the chance structures in its initial generation. In most cases, the networks produced have been structurally fairly simple.

PERFORMANCE CRITERIA

There are several common ways to look at the changes in population performance over time in genetic optimization systems, and most of our charts include four. Because our reproductive plan goes through separate phases of reproduction and evaluation, the data points are actually recorded at the end of each generation.

Define $S_i$ to be the score of the ith individual generated. The best function indicates the performance of the best individual discovered by the GA up to a given time, i.e.

$$\text{Best}(i) = \text{Max}[S_j, j=1, \ldots, i]$$

The off-line GA performance is the mean of the best individual's scores found up to a give time:

$$\text{Off-line}(i) = \frac{1}{i} \sum_{j=1}^{i} \text{Best}(j)$$

An alternative is the on-line performance. This is simply the mean of all individuals scores evaluated so far. At the end of time i, this. would be:

$$\text{On-line}(i) = \frac{1}{i} \sum_{j=1}^{i} S_j$$

Another interesting function is the average score for all of the individuals in a given generation. If $G_i$ is the set of individuals in the ith generation, then:

$$\text{Average}(i) = \frac{1}{|G_i|} \sum_{j \in G_i} S_j$$

On-line performance is perhaps most relevant to systems that must interact with a real-time process, whereas off-line performance is more relevant to systems that are concerned only with finding the best and not how much it costs to look. For example, if one were picking horses, it would be important to take into consideration all of the poor bets as well as the winners, motivating interest in on-line performance. If one were optimizing a function, the only concern might be about the quality of the best point tested, motivating off-line performance. Noting that the "Best" and "Offline" functions are isotone by definition they can only increase or remain constant over the course of an experiment, and cannot decrease.

EXPERIMENT 1

Application: Digit Recognition
Optimization Criterion: Area under learning
curve Population Size: 30
Generations: 60

The average performance of the network population increased eight-fold from the first to the sixtieth generation. The network learned to criterion in 48 epochs.

Since only one factor was being directly optimized, others such as the number of weights were free to vary. The network had 1481 weights. A network which had exactly one weight connecting each input with each output would have only a third as many weights. Such networks were also produced, and these learned perfectly as well, but took more than twice as long. The performance of this experiment for this 60 generation experiment is summarized by FIG. 18.

In the initial generations, hidden-layer structures were present. It was not obvious to us that this problem is linearly separable until the experiment started producing two-layer structures that were learning perfectly. Since hidden layers are not needed for this problem, and since learning rates in general degrade as hidden layers are added to a network (although this degradation is much less severe with the modified back-propagation rule we are using [Samad, 1988] than with the original rule), towards the end of the simulation multiple-layer structures were rare.

In order to evaluate the performance of the GA in discovering better networks, the digit recognition problem was repeated with the GA disabled. To achieve this, random individuals were generated where crossover or mutation would have been applied. Again, scores were based exclusively on the area under the learning curve. The results of this experiment are charted in FIG. 19.

Figure 20:
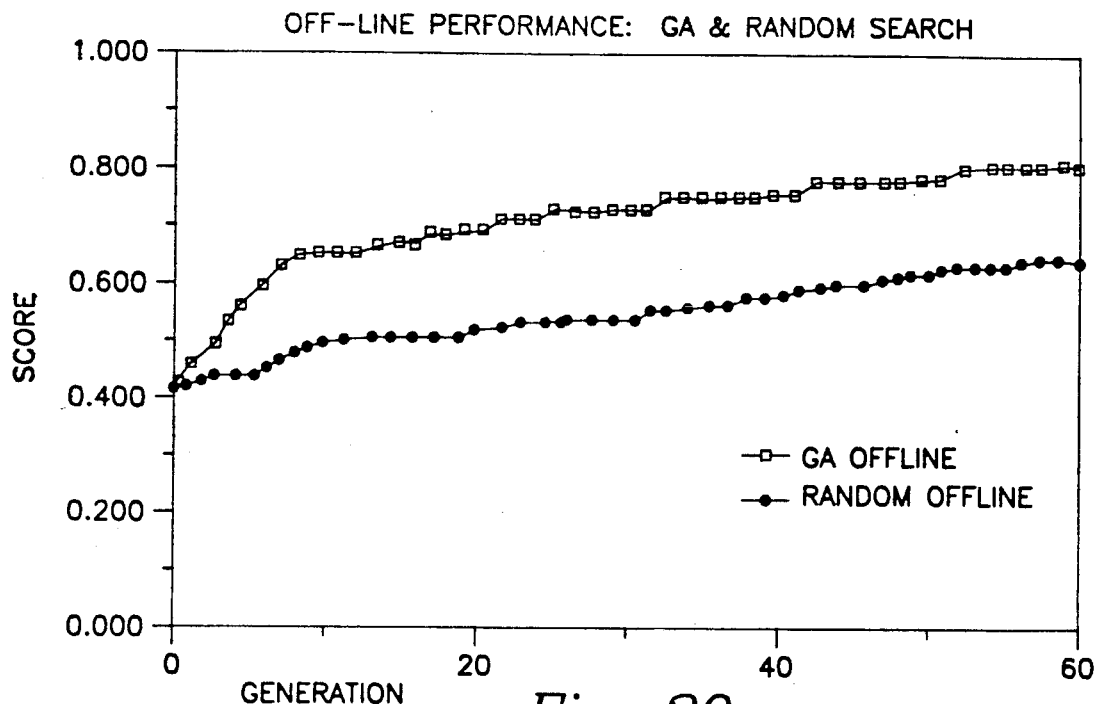

While the random search and GA experiments started with a very similar populations in generation 0, the performance of the two algorithms soon diverged. In particular, average and on-line performances of the random search algorithm were conspicuously inferior to the GA. This is to be expected if the GA is successful in retaining some of the better characteristics from one generation to the next; the random search procedure is confined to picking "losers" at a fairly constant rate. The off-line performance is arguably a more interesting comparison for this problem between the GA and random search. FIG. 20 shows off-line performances extracted from FIGS. 18 and 19.

Once again, the GA performance dominates random search for the duration of the experiment. It could be argued that the gap is not a large one but, as stated, the scores are normalized. The best network discovered (by chance) after 60 generations took 67 epochs to learn the problem while the best network discovered by the GA learned the problem in 40 epochs. Further, it seems likely that we will be able to improve the performance of the GA through altered representation and better parameter values, while there is no latitude for improvement in the performance of the random search procedure. Finally, a caveat: we are running with a relatively small population, and our experiments have been limited to few generations-all of these results should therefore be interpreted with caution.

EXPERIMENT 2

Application: Digit Recognition
Optimization Criteria: Average fan-out and
percent correct
Population Size: 30
Generations: 20

Figure 21:
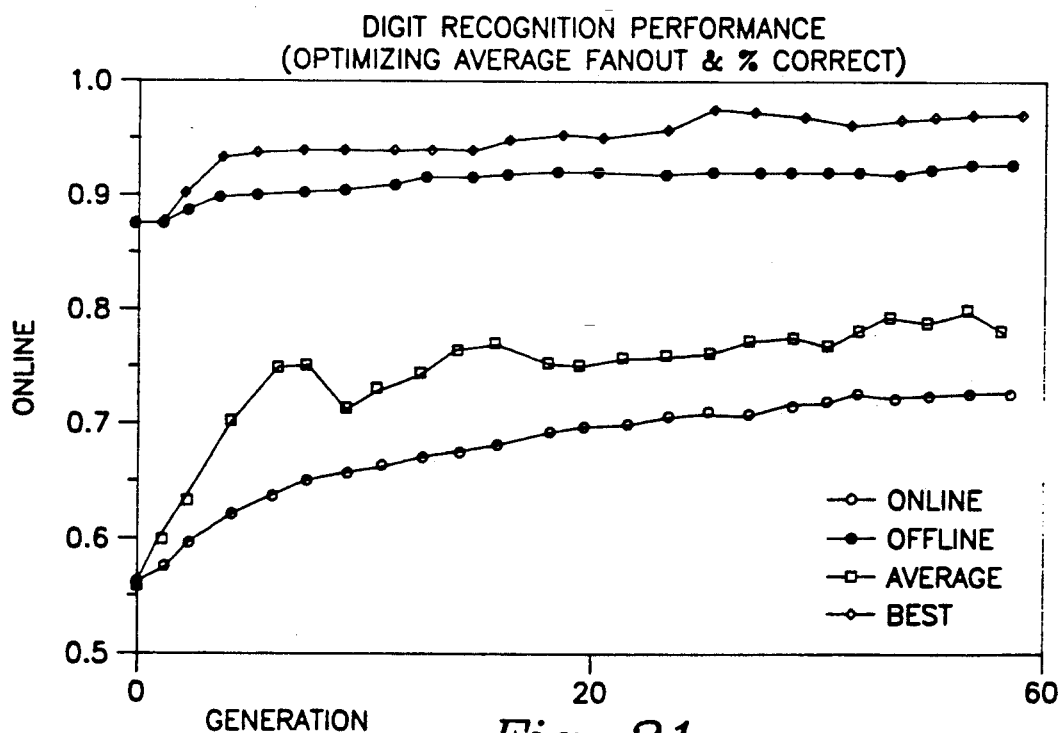

In this experiment, the criteria were the average fan-out and percentage correct, equally weighted (0.5). Learning rate was not given any direct influence on the score. The percentage of correct digit identifications after training was determined by presenting each of the ten digits to the trained network and scoring a "Hit" if the output unit with maximal value corresponded to the correct digit. The average fan-out is defined as the ratio of the number of weights to number of units; this metric is normalized and inverted, so that a large ratio of weights to units will detract from an individual's score. The question posed by this experiment is, can the system improve performance by limiting fan-out? It is a potentially interesting question to designers of neural network hardware, since high fan-outs are difficult to engineer in silicon. [Average fan-out is an approximation of an even more interesting quantity-maximal fan-out.] Our initial results are shown in FIG. 21.

The average fan-out in this experiment was $157/48 = 3.27$. This can be contrasted with the network shown for Experiment 1, which has an average fan-out that is almost an order of magnitude higher.

Learning was quite slow. In fact, the above network did not learn to within the error threshold that was prespecified as a termination criterion for training. (Learning to within the error threshold is not necessary to achieve perfect hit rates.) The connectivity structure of the network uses large receptive fields but low connection density. From a hardware implementation perspective, it would be better to optimize for small receptive fields and such an experiment is contemplated.

METRIC FOR LEARNING RATE

The metric chosen for learning rate requires some explanation. Because of limited computational resources, we cannot hope to train all networks until they achieve perfect accuracy on a given problem, or for that matter to any non-zero predetermined criterion. In some cases, a network any require a hundred epochs while in others a million may be insufficient. Our compromise is to employ two criteria for halting the learning phase. Learning is halted under the first criterion when rms error during the previous epoch was lower than a given threshold. The learning phase is terminated under the second criterion after a fixed number of epochs has been counted; this threshold is set by the experimenter according to the problem, but it is typically between 100 to 5000 epochs. We nonetheless wish to compare all individuals on the same learning rate scale even though their training may have lasted different numbers of epochs and resulted in different final levels of accuracy. Our approximation is to integrate the rms error curve over the learning phase for each individual. This "area under the learning curve" provides a rank that corresponds closely to our intuition about learning rate scales. Lower numbers imply better performance.

$$f(x) = \frac{1}{1 + e^{-x}} \quad (2)$$

In most backpropagation networks, the units are arranged in layers and the networks are constrained to be acyclic. It can be shown that such "multi-layer feed-forward" networks can realize any mapping from a multi-dimensional continuous input space to a multi-dimensional continuous output space with arbitrarily high accuracy (Hecht-Nielsen, 1987; Lippmann, 1987; Lapedes & Farber, 1988).

Appendix A
Syntax for Blueprint Representation in BNF:

```
       <blueprint-spec>        ::=  <input-spec> <middle-spec> <output-spec>
          <input-spec>         ::=  <area-spec> <projection-spec>
         <middle-spec>         ::=  empty | <segment> | <middle-spec> <segment>
         <output-spec>         ::=  <area-marker> <area-id> <dimension-subfield>
           <area-spec>         ::=  <area-marker> <area-id> <dimension-subfield>
                                    <learning-rule-spec>
       <projection-spec>       ::=  <projection-marker> <projection-spec-field> |
                                    <projection-spec>
                                    <projection-marker> <projection-spec-field>
            <segment>          ::=  <area-spec> <projection-spec>
         <area-marker>         ::=  empty
            <area-id>          ::=  <binary-digits>
      <dimension-subfield>     ::=  <total-size> <dim-spec> <dim-spec>
                                    <dim-spec>
     <learning-rule-spec>      ::=  <eta-initial-value> <slope-of-changing-eta>
      <projection-marker>      ::=  empty
   <projection-spec-field>     ::=  <radii-of-connectivity> <connection-density>
                                    <target-address> <target-address-mode>
                                    <learning-rule-spec>
         <binary-digits>       ::=  <binary-digit> | <binary-digits> <binary-digit>
         <upper-bound>         ::=  <binary-digit> <binary-digit> <binary-digit>
           <dim-spec>          ::=  <binary-digit> <binary-digit> <binary-digit>
       <eta-initial-value>     ::=  <binary-digit> <binary-digit> <binary-digit>
     <slope-of-changing-eta>   ::=  <binary-digit> <binary-digit> <binary-digit>
     <radii-of-connectivity>   ::=  <radius-of-connection> <radius-of-connection>
                                    <radius-of-connection>
     <radius-of-connection>    ::=  <binary-digit> <binary-digit> <binary-digit>
      <connection-density>     ::=  <binary-digit> <binary-digit> <binary-digit>
         <target-address>      ::=  <binary-digit> <binary-digit> <binary-digit>
      <target-address-mode>    ::=  <binary-digit>
          <binary-digit>       ::=  0 | 1
```

APPENDIX B

Backpropagation

Neural networks are constructed from two primitive elements: processing units and (directed) connections between units. The processing units are individually quite simple, but they are richly interconnected. Each connection typically has a real-valued weight associated with it, and this weight indicates the effect the value of the unit at the source of the connection has on the unit at its destination. The output of a unit is some function of the weighted sum of its inputs:

$$o_j = f\left(\sum_i w_{ij}o_i - \theta_j\right) \quad (1)$$

Where $o_j$ is the output of unit j, $w_{ij}$ is the weight from unit i to unit j, and $\theta_j$ is the "threshold" or bias weight for unit j. The quantity $\sum_i w_{ij}o_i - \theta_j$ is usually referred to as the net input to unit j, symbolized $net_j$. The form of Eq. (1) that is usually employed with back-propagation is the sigmoid function:

The rule used to modify the weights is:

$$\Delta w_{ij} = \eta o_i \delta_j \quad (3)$$

This is the standard backpropagation learning rule. Here $w_{ij}$ is the weight from unit i to unit j, $o_j$ is the output of unit i, $\eta$ is a constant that determines the learning rate, and $\delta_j$ is the error term for unit j. $\delta_j$ is defined differently for units in the output area and for units in "hidden" areas. For output units, $$\delta_j = o_j'(t_j - o_j)$$

where $o_j'$ is the derivative of $o_j$ with respect to its net input (for the activation function of Eq. (2), this quantity is $o_j(1-o_j)$) and $t_j$ is the target value (the "desired output") for unit j. For hidden units, the target value is not known and the error term is computed from the error terms of the next "higher" layer:

$$\delta_j = o_j' \sum_k w_{jk}\delta_k$$

We have incorporated two extensions to most uses of backpropagation in our current implementation. First, we use a recently discovered improvement of Eq. (3) (Samad, 1988):

$$\Delta w_{ij} = \eta(o_i + \delta_i)\delta_j$$

This equation uses the anticipated value of the source unit of a weight instead of the current computed value. In some cases, orders of magnitude faster learning is achieved.

Second, we allow the value of $\eta$ to decrease as learning proceeds. That is, $\eta$ is now a variable, and the learning rule actually used is:

$$\Delta w_{ij} = \eta_t(o_i + \delta_i)\delta_j$$

where $\eta_t$ is the value of $\eta$ at the tth iteration through the training set. At the end of each iteration, $\eta$ is changed according to the following formula:

$$\eta_{t+1} = \eta_{slope}\eta_t$$

where $\eta_{slope}$ is a parameter that determines the rate of decay of $\eta$. It has been experimentally observed that using a high value of $\eta$ initially and then gradually decreasing it results in significantly faster learning than using a constant $\eta$. Both $\eta_{slope}$ and the initial value of $\eta(\eta_0)$ are given by the projection specification in the blueprint.

APPENDIX C

References

Baker, J. E. (1987). Reducing bias and inefficiency in the selection algorithm. *Proceedings of the Second International Conference on Genetic Algorithms*, pp. 14-21.

Bethke, A. D. (1980). *Genetic Algorithms As Function Optimizers*. Doctoral dissertation, University Microfilms International: Ann Arbor, Mich.

Booker, L. (1987). Improving search in genetic algorithms. *Genetic Algorithms and Simulated Annealing*. L. Davis (Ed.) Morgan Kaufmann, Los Altos, Calif.

Caruana, R. A., and J. D. Schaffer. (1988). Representation and hidden bias: gray vs. binary coding for genetic algorithms. *Proceedings of the 5th International Conference on Machine Learning*, Ann Arbor, Mich. pp. 153-161.

Carpenter, G. A., and S. Grossberg. (1988). The ART of adaptive pattern recognition by a self-organizing neural network. *Computer*. Vol. 21, No. 3, pp. 77-88.

DeJong, K. (1980). Adaptive systems design: a genetic approach. *IEEE Transactions on Systems, Man and Cybernetics*, Vol. 10, No. 9, pp. 566-574.

Dolan, C. P., and M. G. Dyer. (1987). Towards the evolution of symbols. *Proceedings of the Second International Conference on Genetic Algorithms*, pp. 123-131.

Dress, W. B., and J. R. Knisley. (1987). A Darwinian approach to artificial neural systems. *Proceedings of the IEEE Conference on Systems, Man and Cybernetics*, pp. 572-577.

Edelman, G. (1988). *Neural Darwinism*. 1988. Harper and Row.

Goldberg, D. E. (1988). *Genetic Algorithms in Search, Optimization & Machine Learning*. Addison-Wesley: Reading, Mass.

Goldberg, D. E. (1987). Simple genetic algorithms and the minimal, deceptive problem. *Genetic Algorithms and Simulated Annealing*. L. Davis, Ed. Morgan Kaufmann, Los Altos, Calif.

Hinton, G. E. (1988). Generative back-propagation. Paper presented at the International Neural Networks Society Meeting.

Huang, W. Y., and R. P. Lippmann. (1987). Neural net and traditional classifiers. *Neural Information Processing Systems*. D. Z. Anderson, Ed. American Institute of Physics.

Holland, J. (1986). Escaping Brittleness: The Possibilities of General-Purpose Learning Algorithms Applied to Parallel Rule-based Systems. *Machine Learning*, Vol. 2,, Morgan Kaufmann, Los Altos, Calif.

Holland, J. (1975). *Adaptation in Natural and Artificial Systems*. University of Michigan Press, Ann Arbor.

Kohonen, T. E. (1984). *Self-Organization and Associative Memory*. Springer Verlag.

Linsker, R. (1988). Self-organization in a perceptual network. *Computer*. Vol. 21, No. 3, pp. 105-117

Le Cun, Y. (1986). Learning process in an asymmetric threshold network. *Disordered Systems and Biological Organization*. E. Bienenstock et al. Ed. Springer Verlag.

Parker, D. B. (1985). *Learning-Logic*. TR-47, Center for Computational Research in Economics and Management Science, MIT, April.

Rumelhart, D. E. (1988). Plenary talk at the IEEE International Conference on Neural Networks, San Diego.

Rumelhart, D. E., G. E. Hinton, and R. J. Williams. (1985). *Learning Internal Representations by Error Propagation*. ICS Report 8506, Institute for Cognitive Science, University of California, San Diego.

Samad, T. (1988). Back-propagation is significantly faster with anticipated values of source units. *Neural Networks*, Vol. 1, Sup. 1. (Abstracts of the First Annual INNS Meeting.)

Werbos, P. J. (1974). *Beyond Regression: New Tools for Prediction and Analysis in the Behavioral Sciences*. Ph.D. thesis, Department of Applied Mathematics, Harvard University, Cambridge, Mass.

It is claimed:

1. A method for synthesizing designs for neural networks which involves the use of a selected learning algorithm and a particular subject to be learned, comprising the steps of:

A. devising a bit string parametric representation of a neural network architecture having relevant parameters, B. generating a first generation of network blueprints based on said representation which jointly include a range of values for each of said parameters, C. generating respective neural network architectures based on the current generation of said blueprints, D. training each of said network architectures presently defined in step C via said selected learning algorithm and said subject matter, E. testing each of said network architectures presently defined in step C with test patterns corresponding to said subject matter for testing the receptiveness of each of said architectures presently defined in step C to the effect of said training, F. performing an evaluation for each of said network architectures called network models presently defined in step C after said testing thereof relative to performance and cost factors of interest and assigning a score thereto representing the results of said evaluation, and wherein said network model is deemed a test model and wherein a fitness is a combined measure of its worth which takes into account at least one attribute including learning speed, accuracy and cost factors involving the size and the complexity of said tested model, G. selecting candidates from said network architectures presently identified in step C in accordance with some rationale and applying at least one operator thereto to produce a new generation of network blueprints which shall be identified as the current generation of network blueprints based on said representation, and H. returning to step C and continuing the process.

2. A method according to claim 1 wherein said operator is a genetic operator.

3. A method according to claim 2 further including the step of representing said architecture as a genetic blueprint via said bit string.

4. A method according to claim 3, including the further step of subjecting said blueprint to recombination relative to said range of values resulting in different but related network architectures.

5. A method according to claim 4 including the further step of subjecting said blueprint to mutation relative to said range of values.

6. A method according to claim 4, including the further step of subjecting said blueprint to mutation relative to said range of values.

7. A method according to claim 2 wherein said learning algorithm is of the backpropagation type.

8. A method according to claim 1 wherein said parameters of step A include the size of said neural network architecture in terms of computational units and the configuration of said units.

9. A method according to claim 1 wherein said neural network architecture includes computational units forming at least two layer areas, and said parameters of step A including at least one group of connections deemed a projection extending from ones of said computational units in one of said layer areas to other of said computational units in another of said layer areas.

10. A method for synthesizing, using a selected learning algorithm and a particular subject to be learned, designs for neural networks each of which comprise, a plurality of computational units, a plurality of hierarchically arranged layer areas including input and output layer areas and zero or more hidden layer areas therebetween, each of said layer areas being defined by a number of said units, connecting means connecting source groups of said units in said layer areas other than said output layer area with object groups of said units in said layer areas other than said input layer area, said connecting means being grouped in sets deemed projections with each of said projections extending from one of said layer areas to another of said layer areas, said method comprising the steps of:

A. providing a substring format for specifying each of said layer areas with said format having one first type part deemed a layer area parameter specifier and at least one second type part for each of said projections deemed a projection specifier, said first type part comprising a layer area identifying address section, a total size section denoting the corresponding number of said units thereof, and a dimension section denoting the configuration formed by said units, each said second type part being dedicated to one of said projections deemed a subject projection, said second part type comprising a target address section for identifying one of said layer areas deemed a target layer area to which said subject projection is directed, a mode of address section for said subject projection, a dimension section for denoting the configuration of an object field for said subject projection in said target layer area, a connection density section for denoting the connectivity of said subject projection to said object field, and at least one learning rule parameter section, B. devising a bit string parametric representation of a neural network architecture based on said substring format and having relevant parameters, C. generating a first generation of network blueprints based on said representation which jointly include a range of values for each of said parameters, D. generating respective neural network architectures based on the current generation of said blueprints, E. training each of said network architectures presently defined in step D via said selected learning algorithm and said subject matter, F. testing each of said network architectures presently defined in step D with test patterns corresponding to said subject matter for testing the receptiveness of each of said network architectures presently defined in step D to the affect of said training, G. performing an evaluation for each of said network architectures presently defined in step D after said testing thereof relative to performance and cost factors of interest and assigning a score thereto representing the results of said evaluation, H. selecting candidates from said network architectures presently identified in step D in accordance with selected rationale and applying at least one genetic operator thereto to produce a new generation of network blueprints which shall be identified as the current generation of network blueprints based on said representation, and I. returning to step D and continuing the process.

11. A method for synthesizing designs for neural networks which involves the use of a selected learning algorithm and a particular subject to be learned, comprising the steps of:

A. devising a bit string parametric representation of a neural network architecture having relevant parameters, B. generating a first generation of network blueprints based on said representation which jointly include a range of values for each of said parameters, C. generating respective neural network architectures based on the current generation of said blueprints, D. training each of said network architectures presently defined in step C via said selected learning algorithm and said subject matter, E. testing each of said network architectures presently defined in step C with test patterns corresponding to said subject matter for testing the receptiveness of each of said architectures presently defined in step C to the effect of said training, F. performing an evaluation for each of said network architectures called network models presently defined in step C after said testing thereof relative to performance and cost factors of interest and assigning a score thereto representing the results of said evaluation, G. selecting candidates from said network architectures presently identified in step C in accordance with some rationale and applying at least one operator thereto to produce a new generation of network blueprints which shall be identified as the current generation of network blueprints based on said representation, and H. returning to step C and continuing the process, and wherein said neural network architecture includes computational units forming at least two layer areas, and said parameters of step A including at least one group of connections deemed a projection extending from ones of said computational units in one of said layer areas to other of said computational units in another of said layer areas, and wherein there are at least three of said layer areas and at least two of said projections extend from one of said layer areas to two different ones of said layer areas.

12. A method according to claim 11 wherein said parameters include a learning rule parameter for adjusting the learning rule.

13. A method according to claim 11 wherein said parametric representation of step A is a bit string which includes the size of said neural network architecture in terms of computational units and the configuration of said units.

* * * * *